US007197871B2

(12) United States Patent
Yoshino

(10) Patent No.: US 7,197,871 B2
(45) Date of Patent: Apr. 3, 2007

(54) POWER SYSTEM AND WORK MACHINE USING SAME

(75) Inventor: Kazunori Yoshino, Kobe (JP)

(73) Assignees: Caterpillar Inc, Peoria, IL (US); Shin Caterpillar Mitsubishi Ltd (JP)

( * ) Notice: Subject to any disclaimer, the term of this patent is extended or adjusted under 35 U.S.C. 154(b) by 135 days.

(21) Appl. No.: 10/714,171

(22) Filed: Nov. 14, 2003

(65) Prior Publication Data

US 2005/0103006 A1 May 19, 2005

(51) Int. Cl.
*F16D 31/02* (2006.01)

(52) U.S. Cl. ........................................ 60/414

(58) Field of Classification Search .................. 60/414
See application file for complete search history.

(56) References Cited

U.S. PATENT DOCUMENTS

| | | | | |
|---|---|---|---|---|
| 3,947,744 | A | 3/1976 | Grace et al. | |
| 5,794,442 | A * | 8/1998 | Lisniansky | 60/414 |
| 6,460,332 | B1 * | 10/2002 | Maruta et al. | 60/414 |
| 6,945,039 | B2 * | 9/2005 | Yoshino | 60/414 |

FOREIGN PATENT DOCUMENTS

| | | | |
|---|---|---|---|
| DE | 43 24 464 | A1 | 1/1995 |
| DE | 101 28 584 | A1 | 12/2002 |
| JP | PAJ 2002-195218 | | 10/2002 |

* cited by examiner

*Primary Examiner*—F. Daniel Lopez
(74) *Attorney, Agent, or Firm*—Liell & McNeil

(57) ABSTRACT

Engineers are constantly seeking methods to reduce undesirable emissions, noise, and vibrations created by power systems. In the present invention, a power system includes at least one hydraulic cylinder that defines a first fluid volume and a second fluid volume separated from one another via a moveable plunger. Hydraulic power created within the hydraulic cylinder is converted to mechanical energy by a variable displacement hydraulic motor that is fluidly connected to at least the first fluid volume. A generator is attached to the variable displacement hydraulic motor, and produces electrical power that is stored in a power storage system. The stored power can be supplied to an electric motor that is operable to power a hydraulic pump. The hydraulic pump supplies hydraulic fluid to the hydraulic cylinder. The power system of the present invention is a relatively efficient alternative to a power system including a diesel engine that can be a source of undesirable emissions, noise and vibrations.

17 Claims, 2 Drawing Sheets

POWER SYSTEM AND WORK MACHINE USING SAME

TECHNICAL FIELD

The present invention relates generally to power systems, and more specifically to a power system that is able to recover energy within a work machine.

BACKGROUND

Diesel engines are often used to power various types of work machines. Despite various improvements made over the years to diesel engines, diesel engines still remain not only a source of vibration and noise, but also undesirable emissions, such as carbon dioxide ($CO_2$), nitrogen oxides ($NO_x$), unburned hydrocarbons and soot. All of these have been found to contribute to global warming and air pollution.

Over the years, engineers have attempted to decrease the use of diesel engines in order to decrease undesirable emissions, along with noise and vibrations. For instance, work machines often use a diesel engine to power a hydraulic pump that delivers hydraulic fluid to a hydraulic cylinder. Movement of a plunger within the hydraulic cylinder drives the movement of the work machine's implement, such as a loader, excavator, or the like. When the plunger is retracting in the gravity direction of a weight load, some of the energy of the hydraulic fluid being pushed from a decreasing volume of the cylinder below the plunger can be captured and re-used. The hydraulic fluid being pushed out of the cylinder can flow to an increasing volume above the retracting plunger within the cylinder. Thus, during retraction, some of the hydraulic power created within the hydraulic cylinder can be recovered, and the pump hydraulic fluid flow can be decreased, thereby decreasing the required diesel engine power.

However, because the increasing volume above the retracting plunger is limited by a rod connecting the plunger to a weight, the increasing volume is substantially smaller than the decreasing volume below the retracting plunger. In order to accommodate the smaller size of the increasing volume, a throttle valve is used to bleed to a hydraulic tank approximately 50% of the pressurized hydraulic fluid flowing from the fluid volume below the plunger. Thus, only a portion of the hydraulic fluid being pushed from the cylinder by the retracting plunger is available to produce power within the power system. Because of the significant amount of high pressure hydraulic flow being bled from the power system, the rate of energy recovery can be too low to be efficient. In addition, the energy recovery only occurs when the plunger is retracting within the cylinder, thereby further reducing the efficiency of the energy recovery.

In order to increase the energy recovery, engineers have found methods of storing the captured energy from the pressurized hydraulic flow. For instance, Patent Abstracts of Japan 2002-195218, which was published Jul. 10, 2002, shows that during plunger retraction, the flow of hydraulic fluid from the hydraulic cylinder can also be used to rotate a turbine that powers a generator. Electric current generated by the generator is delivered to a water reservoir, in which electrolysis separates the water into hydrogen and oxygen. The hydrogen is accumulated and stored in a hydrogen absorbing alloy. When needed, the hydrogen gas can be delivered to a fuel cell, in which it is re-combined with oxygen to produce heated water and electric current. The electric current is delivered to an electric motor that powers the hydraulic pump. Thus, the diesel engine can be replaced with the electric motor partially driven by hydraulic power, thereby even further reducing undesirable emissions, noise, and vibrations, and increasing the efficiency of the energy recovery.

Although the electric motor powered by the fuel cell does decrease undesirable emissions, noise and vibrations, there is still room for improvement. Even with the use of the electric motor, the excess hydraulic flow from the fluid volume below the retracting plunger to the fluid tank is throttled by the throttle valve prior to powering the turbine. Thus, some of the hydraulic power of the flow is wasted, rather than used to power the generator.

The present invention is directed to overcoming one or more of the problems set forth above.

SUMMARY OF THE INVENTION

In one aspect of the present invention, a power system includes an electric motor that is operable to power a hydraulic pump that is fluidly connected to at least one hydraulic cylinder. The hydraulic cylinder defines a first fluid volume and a second fluid volume that are separated by a moveable plunger. A variable displacement hydraulic motor, which is operable to power a generator, is fluidly connected to at least the first fluid volume of the hydraulic cylinder. The generator is operably coupled to the electric motor via a power storage system.

In another aspect of the present invention, there is a method of operating a power system. A variable displacement hydraulic motor converts hydraulic power created within a hydraulic cylinder to mechanical power in order to power a generator. The power created by the generator is stored in a power storage system. In order to power a hydraulic pump, the electrical power is supplied from the power storage system to an electric motor that is coupled to the hydraulic pump. The hydraulic pump supplies hydraulic fluid to the hydraulic cylinder.

DETAILED DESCRIPTION

Figure 1:
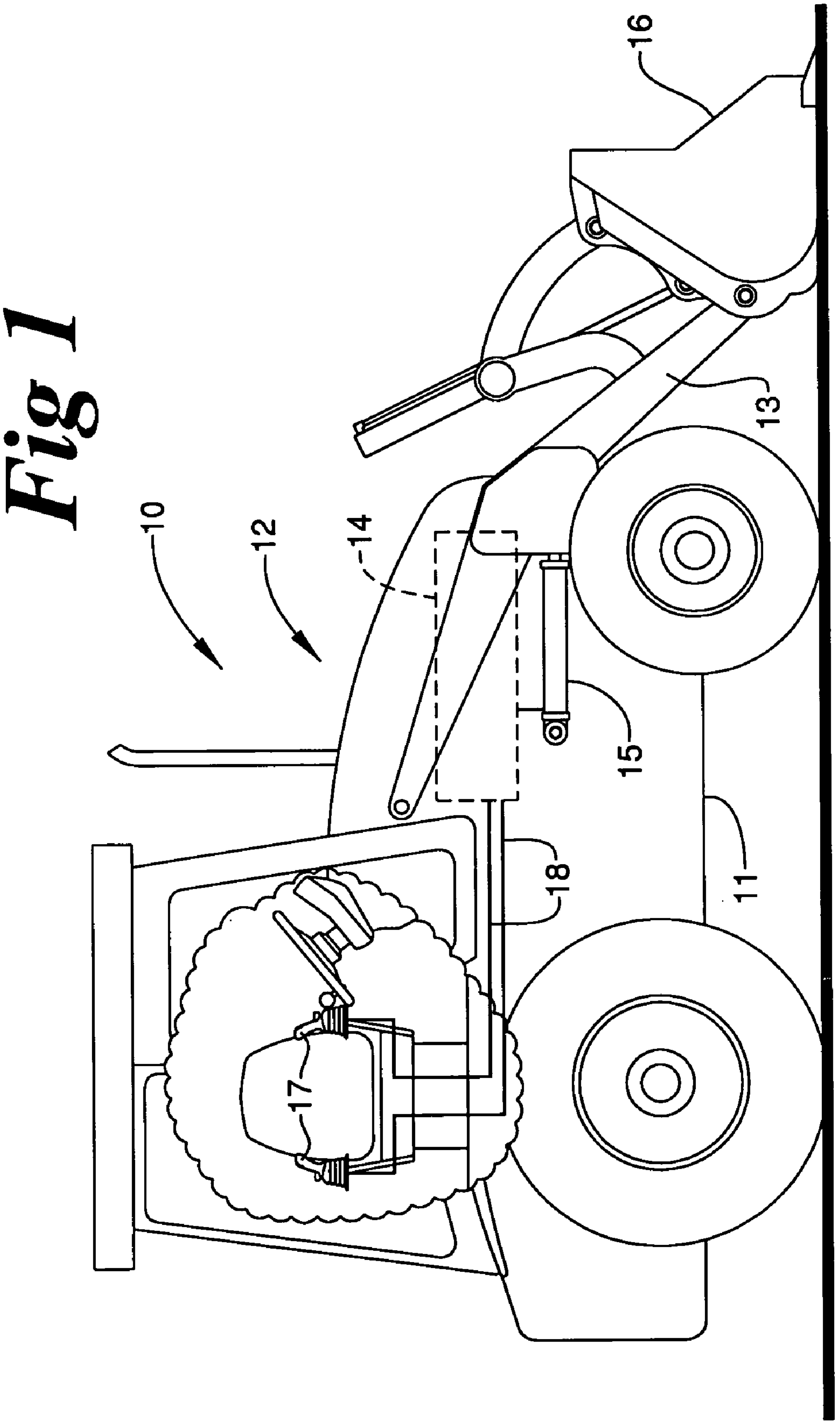
FIG. 1 is a side view of an example of a work machine, according to the present invention.

Referring to FIG. 1, there is shown a side view of a work machine 10. The work machine 10 includes a work machine body 11 to which an implement is attached. Although the work machine 10 is illustrated as a loader 12, it should be appreciated that the present invention is applicable to work machines including any type of hydraulically controlled implement. In addition, the present invention is applicable to work machines including more than one implement. Moreover, the present invention is applicable to power systems used to power apparatuses other than implements, and/or within vehicles other than construction work machines.

The loader 12 is controlled with implement controls 17. Although the work machine 10 includes the implement controls 17 being attached to an arm of the operator's seat, those skilled in the art will appreciate that the implement controls 17 can be positioned at any point within an operator's control station that is within the operator's reach. The implement controls 17 are preferably in electrical communication via implement communication lines 18 with a power system 14 attached to the work machine body 11. The power system 14 includes various valves (shown in FIG. 2) that control the flow of hydraulic fluid to and from a hydraulic cylinder 15. The loader 12 includes a bucket 16 operably coupled to move with the movement of a plunger 19 (shown in FIG. 2) within the hydraulic cylinder 15. In the illustrated example, hydraulic cylinder 15 is operable to move a pair of arms 13 of the loader 12 upwards and downwards in order to lift and lower the loader bucket 16. Although the work machine 10 is described as including only one hydraulic cylinder 15, it should be appreciated that the present invention contemplates a power system including any number of hydraulic cylinders. For instance, the work machine 10 could include a second hydraulic cylinder that controls the movement of the loader bucket 16 about a horizontal axis.

Figure 2:
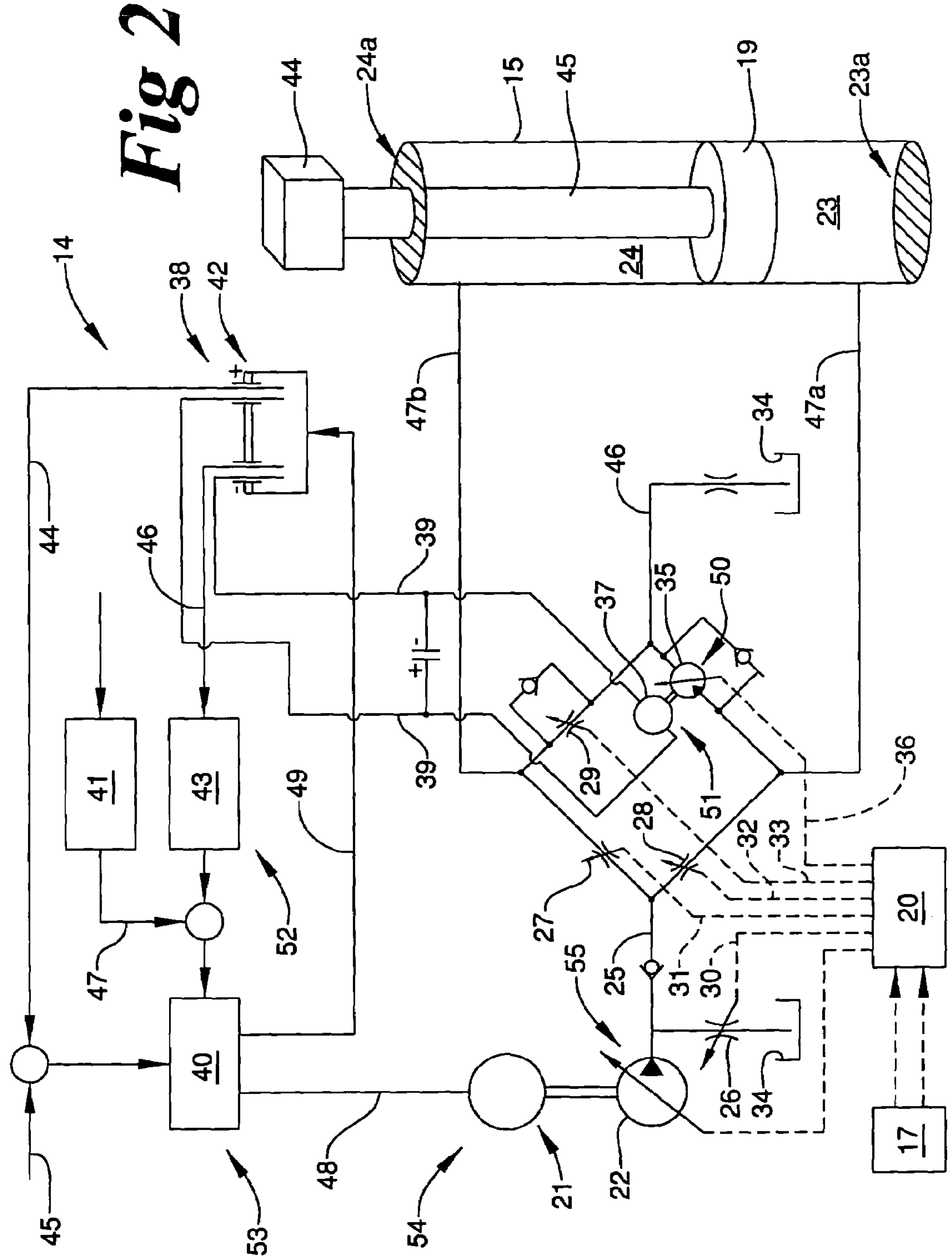
FIG. 2 is a schematic representation of a power system included within the work machine of FIG. 1.

Referring to FIG. 2, there is shown a schematic representation of the power system 14 within the work machine 10 of FIG. 1. The power system 14 includes a hydraulic pump 22 that is powered by an electric motor 21. The power system includes means 55 for supplying hydraulic fluid, via the hydraulic pump 22, to the hydraulic cylinder 15. The hydraulic pump 22 is fluidly connectable via a supply line 25 to a first fluid volume 23 and a second fluid volume 24 defined by the hydraulic cylinder 15. The first fluid volume 23 and the second fluid volume 24 are also fluidly connectable to a hydraulic fluid tank 34 via a tank line 46. The supply line 25 and the tank line 46 share common portions 47*a* and 47*b*. The first fluid volume 23 and the second fluid volume 24 are fluidly connectable to one another via the supply line 25 and the common portions 47*a* and 47*b*.

The moveable plunger 19 separates the first fluid volume 23 from the second fluid volume 24 of the hydraulic cylinder 15. A rod 45 couples the plunger 19 to a weight 44 (loader bucket 16) that is operable to drive the movement of the plunger 19 within the hydraulic cylinder 15. In order to lower the loader arms 13, the plunger 19 retracts under the weight 44, and in order to raise the loader arms 13, the plunger 19 advances against the weight 44. The first fluid volume 23 is positioned on an opposite side of the plunger 19 than the weight 44, and the second fluid volume 24 is positioned on a same side of the plunger 19 as the weight 44. Due to the space consumed by the rod 45, as the plunger 19 retracts and advances, an altered cross section 23*a* of the first fluid volume 23 will be greater than an altered cross section 24*a* of the second fluid volume 24.

The supply line 25 includes first, second and third valves 26, 27 and 28, and the tank line 46 includes a fourth valve 29. The valves 26, 27, 28 and 29 control the flow to and from the hydraulic cylinder 15. The valves 26, 27, 28 and 29 are preferably in electrical communication with an electronic control module 20 via first, second, third and fourth valve communication lines 30, 31, 32 and 33, respectively. Further, the implement controls 17 are in communication with the electronic control module 20 via the control communication lines 18. Thus, the position of the implement controls 17 that corresponds to a desired position of the loader bucket 16 can be communicated to the electronic control module 20 via the implement communication lines 18. The electronic control module 20 can then determine the position of each valve 26, 27, 28, and 29 in order to create the hydraulic flow required to achieve the desired movement of the loader bucket 16. The controls may also be connected directly to the valves without departing from the present invention.

When the electronic control module 20 determines that the implement controls 17 are in a neutral position, the electronic control module 20 will ensure that valve 26 is in an open position, allowing the flow of hydraulic fluid from the hydraulic pump 22 to flow to a hydraulic fluid tank 34. When the electronic control module 20, via the position of the implement controls 17, determines that the operator desires the loader bucket 16 to be raised, the electronic control module 24 will ensure that valve 26 is in a closed position and valve 28 is move towards an open position. Thus, hydraulic fluid can flow from the hydraulic pump 22 via supply line 25 to the first fluid volume 23 of the hydraulic cylinder 15. The electronic control module 20 will also ensure that valve 27 is in a closed position, and valve 29 in an open position, allowing hydraulic fluid from the second fluid volume 24 to flow to the fluid tank 34. Thus, the plunger 19 can advance against the weight 44, causing the loader bucket 16 to move upwards. When the electronic control module 20 determines that the operator desires the loader bucket 16 to be lowered, the electronic control module 20 can ensure that valve 26 and valve 29 are in the closed position and valves 27 and 28 are moved towards the open position, allowing hydraulic fluid to flow from both the hydraulic pump 22 and the first fluid volume 23 to the second fluid volume 24 of the hydraulic cylinder 15. Further, the hydraulic fluid can also flow from the second fluid volume 24 to the fluid tank 34 across valve 29. Thus, the plunger 19 can retract under the weight 44, causing the loader bucket 16 to move downwards.

The hydraulic cylinder 15 is configured not only to receive hydraulic fluid from the hydraulic pump 22, but also to produce hydraulic power that drives the variable displacement hydraulic motor 35. The power system 14 includes means 50 for converting hydraulic power produced within the hydraulic cylinder 15 to mechanical power via a variable displacement hydraulic motor 35. The electronic control module 20 is in communication with the variable displacement hydraulic motor 35 via a motor communication line 36. The variable displacement hydraulic motor 35 is fluidly positioned between the first fluid volume 23 of the hydraulic cylinder 15 and the tank line 46. Thus, as the plunger 19 retracts, a portion of the pressurized fluid flowing from the first fluid volume 23 towards the second volume of fluid 24 can be diverted and used to power the variable displacement hydraulic motor 35. When the electronic control module 20 determines, via the position of the implement controls 17, that the operator desires the loader bucket 16 to be lowered, the electronic control module 20 will vary the displacement of the variable displacement hydraulic motor 35 in order to achieve the desired retracting speed of the plunger 19, and thus, the desired lowering speed of the loader bucket 16. The power system 14 also includes means 51 for converting the mechanical power created by the variable displacement hydraulic motor 35 to electrical power. The means 51 includes a generator 37 attached to the variable displacement hydraulic motor 35 in a conventional manner. The variable displacement hydraulic motor 35 is configured to power the generator 37 that creates electrical power.

The power system 14 includes means 52 for storing the electrical power produced by the generator 37. Although the present invention contemplates various means for storing the electrical power, including but not limited to, a battery and/or capacitor, the power storage system 38 preferably stores the electrical power as hydrogen. A power storage system 38 is configured to store the electrical power as hydrogen, and is in electrical communication with the generator 37 via storage communication lines 39. The power storage system 38 includes an electrolysis device 42 that includes a water reservoir and is fluidly connected to a hydrogen storage device, herein referred to as a hydrogen-absorbing alloy cell 43, of a type known in the art. The electric current that is delivered to the electrolysis device 42 from the generator 37 via the communication lines 39 flows through the water within the water reservoir separating the water into hydrogen and oxygen gasses. The power system 14 includes means 53 for re-producing electrical power by combining the hydrogen with oxygen. A fuel cell 40 is configured to re-produce electrical power by combining the hydrogen with oxygen, and is fluidly connected with the electrolysis device 42 via an oxygen line 44. Ambient air is drawn into the oxygen line 44 via an air line 45. The hydrogen from the electrolysis device 42 can be delivered via a hydrogen line 46 to the hydrogen absorbing alloy cell 43. The hydrogen can be absorbed within the alloy cell 43, and released to the fuel cell 40 when the electric motor 21 requires power. Thus, the hydraulic power created by the retracting plunger 19 can be captured for later use within the power system 14 by controlling the flow of hydrogen from the hydrogen absorbing alloy cell 43 to the fuel cell 40.

Preferably, the means 53 for re-producing the electrical power includes a reformer 41 that also contributes to the supply of hydrogen to the fuel cell 40. Those skilled in the art will appreciate that the reformer 41 creates hydrogen gas by reforming various hydrocarbons and alcohol fuels, including but not limited to, methanol and ethanol. The reformer 41 is fluidly connected to the hydrogen line 46 via a reformer line 47. Although the power storage system 38 is illustrated as including the reformer 41, the electrolysis device 42 and the hydrogen absorbing alloy cell 43, it should be appreciated that the present invention contemplates the power storage system 38 including only the electrolysis device 42 and the hydrogen absorbing alloy cell 43 in order to produce and store hydrogen. The fuel cell 40 can re-combine the oxygen from the ambient air and the electrolysis device 42 with the hydrogen from the reformer 41 and the hydrogen-absorbing alloy cell 43 in order to form heated water and electric current. Those skilled in the art will appreciate that various types of fuel cells can be used within the present invention.

The power system 14 also includes means 54 for supplying the electric motor 21 coupled to the hydraulic pump 22 with the electrical power from the fuel cell 40. The electric motor 21 is configured to power the hydraulic pump 22 with the electrical power from the fuel cell 40. The electric current can be supplied to the electric motor 21 via an electric supply line 48, and the water can be re-cycled back to the water reservoir within the electrolysis device 42 via recycled water line 49. It should be appreciated that the present invention contemplates the water, which is heated from the reaction within the fuel cell 40, being recycled through a heat exchanger in order to efficiently use the heat within the water while cooling the water before being delivered to the electrolysis device 42. Thus, the re-cycled water can aid in heating other hydraulic systems within the work machine and reduce the need of burdensome re-filing of the electrolysis device 42.

INDUSTRIAL APPLICABILITY

Referring to FIGS. 1 and 2, the present invention will be described for the operation of the power system 14 included within work machine 10. Although the power system 17 drives the hydraulically activated loader 12, it should be appreciated that the present invention contemplates power systems that drive various work machine implements and/or auxiliary systems. Further, the present invention contemplates applications in machines and/or vehicles other than work machines.

In order to operate the power system 14, the hydraulic power created by the retracting plunger 19 is converted to mechanical power that drives the generator 37. When the operator moves the implement controls 17 to lower the loader bucket 16, the movement of the controls 17 will be communicated to the electronic control module 20 via the control communication lines 18. The electronic control module 20 will appropriately position valves 26, 27, 28 and 29 to lower the bucket 16, which can be accomplished in a number of ways. For instance, valve 28 could be closed and valve 27 opened such that second volume 24 is filled via supply line 25 from pump 22. Any excess fluid from pump 22 can be channeled back to tank 34 across valve 26. In a second alternative, valve 27 would be closed and volume 24 filled from tank 34 via a vacuum past the check valve located near valve 29. A third alternative could be some combination of the first and second alternatives. A fourth alternative could be to reduce pump 22's output to zero, and open valves 27 and 28 to fill volume 24 from volume 23. In any event, the first volume of fluid 23 is pressurized by the weight of the loader bucket 16, loader arms 13, and any load that is in loader bucket 16. All or at least a portion of the fluid displaced from first volume 23 can be channeled through variable displacement motor 35 on its way to either tank 34. By varying the displacement of the variable displacement hydraulic motor 35, the electronic control module 20 will control the speed of the retraction of the plunger 19 in order to achieve the desired speed of the lowering of the loader bucket 16. The pressurized hydraulic fluid flowing through the variable displacement motor towards the tank line 46 to tank 34 will drive the variable displacement hydraulic motor 35. The rotation of the variable displacement hydraulic motor 35 powers the generator 37 that creates electrical power. It is recognized that if total power regeneration is not required, fluid from the first fluid chamber 23 can be controllably diverted across valve 28 to aid in filling the second fluid volume 24. Likewise, if too much fluid is being passed across the valve 28 to the second fluid volume 24, the valve 29 can be controllably opened to the tank 34 to avoid pressurizing the second fluid chamber 24.

In order to store the electrical power created by the generator 37, the electric current is delivered from the generator 37 to the electrolysis device 42, in which the electric current is converted to chemical energy. Within the electrolysis device 42, the electric current is delivered between two electrodes within the water reservoir in order to produce hydrogen gas and oxygen gas. The hydrogen gas is delivered to the hydrogen-absorbing alloy cell 43 via the hydrogen line 46. Power is conserved by accumulating and storing the hydrogen within the hydrogen-absorbing alloy cell 43 until the hydrogen is needed to create electrical power within the fuel cell 40 in order to power the electric motor 21. When the hydrogen is delivered from the hydrogen-absorbing alloy cell 43 to the fuel cell 40, the hydrogen is preferably supplemented by hydrogen produced within the reformer 41 via the reformer line 47. The reformer 41 reforms any of various hydrocarbons or alcohol fuels to produce hydrogen. Although the present invention is illustrated as using both the reformer 41 and the electrolysis device 42 to create hydrogen, it should be appreciated that the hydrogen could be created and stored by use of only the electrolysis device 42 and the hydrogen-absorbing alloy cell 43.

The oxygen created by the electrolysis of the water is preferably combined in the oxygen line 44 with oxygen within ambient air from the air line 45. The oxygen is delivered to the fuel cell 40. Within the fuel cell 40, the oxygen gas is combined by methods known in the art with the hydrogen gas in order to produce heated water and electrical power. Preferably, the heated water passes through a heat exchanger in order to efficiently use the heat within the water and to cool the water. The cooled water can be delivered to the electrolysis device 42 via the re-cycled water line 49 in order to avoid burdensome re-filling of the water reservoir within the device 42. The electrical power is supplied to the electric motor 21 in order to power the hydraulic pump 22. The hydraulic pump 22 can then deliver hydraulic fluid to the hydraulic cylinder 15 during retraction of the plunger 19, and the process of energy recovery can repeat itself.

The present invention is advantageous because it provides an efficient alternative to a diesel engine power system. The power system 14, including the electrolysis device 42, the reformer 41, the hydrogen-absorbing alloy cell 43 and the fuel cell 40, is efficient because the electrical power of the generator 37 can be stored as chemical energy within the hydrogen-absorbing alloy cell 43 until needed. When the hydraulic pump 22 requires power, the chemical energy can be converted back to electrical energy within the fuel cell 40 and supplied to the electric motor 21 that drives the hydraulic pump 22. Therefore, the electric motor 21 output can be controlled at an optimum level by appropriately controlling the amount of hydrogen gas supplied from the hydrogen absorbing alloy 43 to the fuel cell 40. Further, because the power system 14 does not include the diesel engine, undesirable emissions, such as $CO_2$ and $NO_x$, which are major factors in global warming and air pollution, are reduced, if not eliminated. In addition, the noise and vibrations produced by the power system 14 are also reduced. Moreover, the energy within heated water produced by the fuel cell 40 can also be used within heat exchangers of various coolant systems within the work machine 10. The cooled water can also be re-cycled for use within the electrolysis device 42, thereby reducing, if not eliminating, the need to periodically re-filling the water reservoir.

The present invention is further advantageous because it maximizes the recovery of the hydraulic power produced by the retracting plunger. By directing the flow of hydraulic fluid from the first fluid volume 23 during plunger 19 retraction through the variable displacement hydraulic motor 35, the power system 14 can be powered by an unthrottled hydraulic flow passing there through towards the tank line 46. Thus, by replacing a throttle valve with the variable displacement hydraulic motor 35 that regulates the flow of fluid from the larger cross section 23*a* of the first fluid volume 23 during plunger 19 retraction, the efficiency of the power system 14 is increased.

In addition, because the power system 14 includes the storage power system 38, energy may be recovered not only to aid in the hydraulic system operating the implement, but also to aid in other applications within the work machine 10. For instance, the electric motor could power a coolant pump that is part of a coolant system of the same work machine 10. Thus, there may be various uses for the energy stored by the power system 14.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A power system comprising:

an electric motor being operable to power a hydraulic pump;

at least one hydraulic cylinder being fluidly connected to the hydraulic pump and defining a first fluid volume and a second fluid volume separated from one another via a moveable plunger;

a variable displacement hydraulic motor being fluidly connected directly to the first fluid volume defined by the hydraulic cylinder, with no intervening valve, and being operable to power a generator; and a power storage system operably coupling the generator to the electric motor.

2. The power system of claim 1 wherein the power storage system includes a fuel cell, an electrolysis device and a hydrogen storage device.

3. A work machine comprising a work machine body; and the power system of claim 1 being attached to the work machine body.

4. The work machine of claim 3 including an implement attached to the work machine body; and the at least one hydraulic cylinder being operably coupled to move the implement.

5. A power system comprising:

means for converting hydraulic power produced within at least one hydraulic cylinder to mechanical power via a variable displacement hydraulic motor fluidly connected directly to the fluid volume of the hydraulic cylinder, with no intervening valve;

means for converting the mechanical power to electrical power;

means for storing the electrical power;

means for supplying an electric motor coupled to a hydraulic pump with the stored electrical power; and means for supplying hydraulic fluid, via the hydraulic pump, to the at least one hydraulic cylinder.

6. The power system of claim 5 wherein the means for storing electrical power includes a fuel cell, an electrolysis device and a hydrogen storage device.

7. The power system of claim 5 wherein the at least one hydraulic cylinder being operably coupled to move a work machine implement.

8. A method of operating an electrical power system, comprising the steps of:

powering a generator, at least in part, by converting hydraulic power produced within a hydraulic cylinder to mechanical power via a variable displacement hydraulic motor fluidly connected directly to the first fluid volume of the hydraulic cylinder, with no intervening valve;

storing electrical power created by the generator within a power storage system;

powering a hydraulic pump, at least in part, by supplying electrical power from the power storage system to an electric motor coupled to the hydraulic pump; and supplying hydraulic fluid to the hydraulic cylinder, at least in part, by operating the hydraulic pump.

9. The method of claim 8 wherein the step of powering the generator includes a step of producing hydraulic power by retracting a plunger, which separates the first fluid volume from the second fluid volume, within the hydraulic cylinder.

10. The method of claim 9 wherein the step of producing hydraulic power includes a step of controlling a speed of the retracting plunger, at least in part, by varying the displacement of the motor.

11. The method of claim 8 wherein the step of storing includes a step of producing hydrogen within a reformer.

12. The method of claim 8 wherein the step of storing includes a step of creating hydrogen and oxygen within an electrolysis device from electrical power generated by the generator.

13. The method of claim 12 wherein the step of storing includes a step of absorbing the hydrogen in a hydrogen storage device.

14. The method of claim 13 includes a step of powering a hydraulic pump includes a step of re-producing electrical power, at least in part, by combining the hydrogen with oxygen in a fuel cell.

15. A power system comprising:

a variable displacement hydraulic motor being configured to power a generator;

a power storage system being configured to store electrical power produced by the generator;

an electric motor being configured to power a hydraulic pump with the electrical power from the power storage system; and a hydraulic cylinder being configured to receive hydraulic fluid from the hydraulic pump and to produce hydraulic power that drives the variable displacement hydraulic motor, which is fluidly connected directly to the first fluid volume of the hydraulic cylinder, with no intervening valve.

16. The power system of claim 15 wherein the power system includes a fuel cell, an electrolysis device and a hydrogen storage device.

17. The power system of claim 15 wherein the at least one hydraulic cylinder being operably coupled to move a work machine implement.

* * * * *

UNITED STATES PATENT AND TRADEMARK OFFICE

CERTIFICATE OF CORRECTION

PATENT NO. : 7,197,871 B2
APPLICATION NO. : 10/714171
DATED : April 3, 2007
INVENTOR(S) : Yoshino It is certified that error appears in the above-identified patent and that said Letters Patent is hereby corrected as shown below:

In Column 8, Line 33, in Claim 5, before "fluid" delete "the" and insert -- a first --, therefor.

In Column 8, Line 53, in Claim 8, delete "the" and insert -- a --, therefor.

In Column 10, Line 9, in Claim 15, delete "the" and insert -- a --, therefor.

Signed and Sealed this

First Day of July, 2008

JON W. DUDAS
*Director of the United States Patent and Trademark Office*